United States Patent [19]

Moeglich

[11] 4,244,804
[45] Jan. 13, 1981

[54] SLIME AND SLUDGE DEWATERING

[75] Inventor: Karl Moeglich, Dunedin, Fla.

[73] Assignee: Innova, Inc., Clearwater, Fla.

[21] Appl. No.: 3,538

[22] Filed: Jan. 15, 1979

[51] Int. Cl.$^3$ .............................................. B01D 13/02
[52] U.S. Cl. .............................. 204/300 R; 204/180 R
[58] Field of Search ........... 204/180 R, 299 A, 300 R, 204/130, 301, 1, 24; 34/1

[56] References Cited

U.S. PATENT DOCUMENTS

| | | | |
|---|---|---|---|
| 670,350 | 3/1901 | Schwerin | 204/180 R X |
| 894,070 | 7/1908 | Schwerin | 204/300 R |
| 1,435,886 | 11/1922 | Acton et al. | 204/180 R X |
| 1,757,205 | 5/1930 | Morris | 204/180 R X |
| 1,785,484 | 12/1930 | Kastner et al. | 204/180 R X |
| 2,032,624 | 3/1936 | Lyons | 204/1 |
| 2,108,258 | 2/1938 | Fisher | 204/24 |
| 2,320,474 | 6/1943 | Ross | 204/180 R X |
| 2,397,615 | 4/1946 | Mittelman | 204/180 R X |
| 2,740,756 | 4/1956 | Thomas | 204/180 R |
| 3,506,562 | 4/1970 | Coackley | 204/300 R |
| 3,543,408 | 12/1970 | Candor et al. | 204/180 R X |
| 3,624,916 | 12/1971 | Jacobs | 204/180 R X |
| 3,642,605 | 2/1972 | Chenel et al. | 204/300 R |
| 3,664,940 | 5/1972 | Greyson et al. | 204/180 R |
| 3,755,911 | 9/1973 | Candor et al. | 34/1 |
| 3,835,006 | 9/1974 | Fujita et al. | 204/180 R X |
| 3,856,646 | 12/1974 | Morarau | 204/180 R X |
| 3,962,069 | 6/1976 | Inoue et al. | 204/300 R |
| 4,003,819 | 1/1977 | Kunkle et al. | 204/301 |
| 4,101,400 | 7/1978 | Pepping | 204/180 R |

OTHER PUBLICATIONS

Greyson, "Electro-Osmotic Pumping for Dewatering Sewage Sludge," Jul. 1970.

Primary Examiner—Arthur C. Prescott
Attorney, Agent, or Firm—Cushman, Darby & Cushman

[57] ABSTRACT

Apparatus and method for the dewatering of slimes and sludges. An anode and cathode are provided with the sludge disposed between the electrodes, and with a material for providing a continuation of the boundary layer of the sludge disposed in intimate contact with at least the cathode between the cathode and the sludge, the material allowing the passage of water therethrough, and the cathode being constructed to allow passage of water therethrough. The sludge to be treated is maintained between the electrodes during treatment, and structure is provided to ensure continuous contact between the electrodes and the sludge or the like during treatment even as the volume of the sludge decreases due to water removal. The treatment may be continuous or batch, and by practicing the invention it is possible to render sludge incapable of being dewatered by ambient evaporation so that it is capable of being dewatered by ambient evaporation, while applying only about 200 kwh or less of energy; and it is possible to produce a product sufficiently free of heavy metals to be safely used as a fertilizer from sewage sludge containing significant amounts of heavy metals since the heavy metals pass out of the sludge with the water removed therefrom.

15 Claims, 8 Drawing Figures

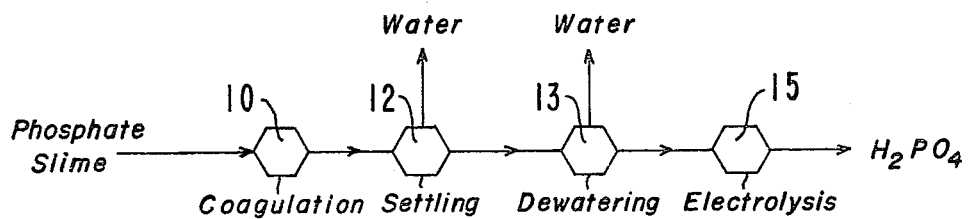
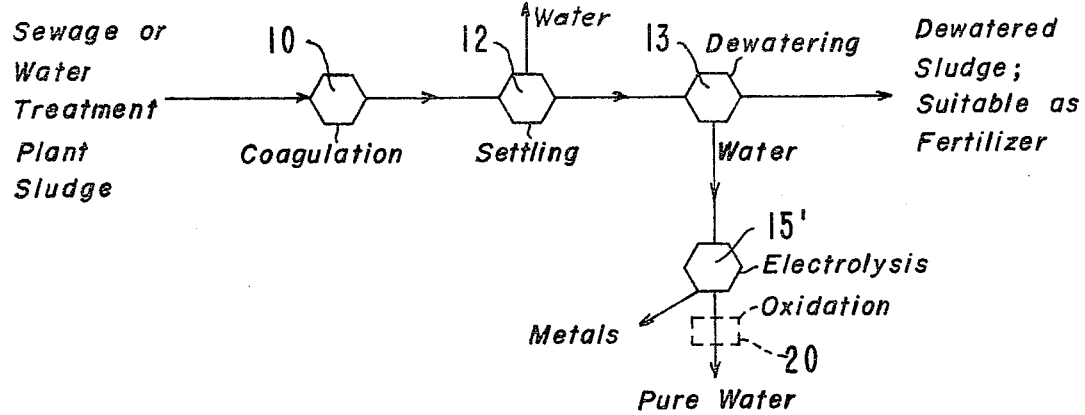
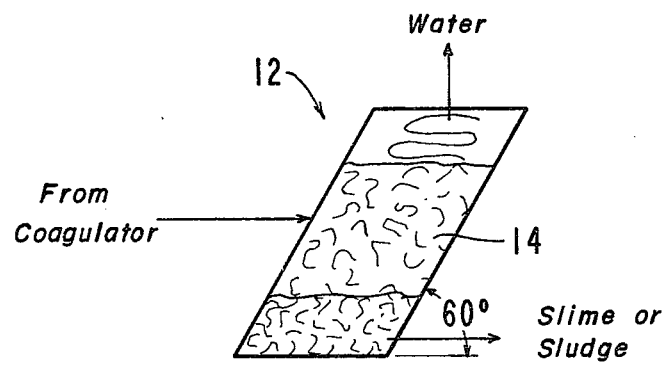
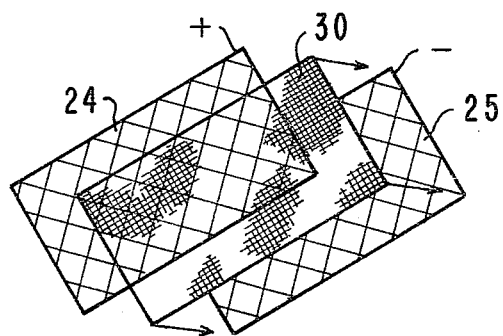

SLIME AND SLUDGE DEWATERING

BACKGROUND AND SUMMARY OF THE INVENTION

Many conventional slimes and sludges are incapable of being dewatered by subjecting them to ambient evaporation. For instance, phosphate slime produced during the production of fertilizer or the like from phosphate rock, will not dry by ambient evaporation even over periods as long as 40 years, and when land filled even after such a long period of exposure to ambient air does not allow the construction of homes or the utilization of heavy equipment on the landfilled area. The fluid boundary layer on the solids in the slimes and sludges is the phenomenon responsible for such water-retaining characteristics of many conventional slimes and sludges, and additionally the boundary layer fluid absorbs relatively high amounts of dissolved matter such as heavy metal salts and dissolved organics. While some slimes and sludges can be subjected to centrifugal force, high pressure, or heat to remove the liquid and/or heavy metal salts and dissolved organics held in place by the solids in the sludge or slime, a very large amount of energy must be applied in order to effect such removal, and in some circumstances (e.g., with phosphate slime) feasible successful methods do not exist for effecting such removal.

Since the holding or bonding forces retaining the liquid with dissolved organics and heavy metal salts in the sludge or slime are of an electrostatic nature, induction, electrostriction, and electrophoresis have been tried in the past to effect dewatering; for instance, attempts at electrophoretic sludge treatment have been made as far back as 1940. However, such prior attempts have been incapable of practically effecting sludge or slime dewatering, in part due to the lack of a suitable anode material (coated valve-metal anodes are now available which overcome that deficiency, however), and because neutral zones of water were formed within the cathode region, accumulation of the water interrupting the continuity of the electrophoretic transport which is dependent upon continuous boundary layers.

According to the present invention, it is possible to effectively dewater a wide variety of slimes and sludges, such as phosphate slime, sewage sludge, sludge from water treatment plants, sludge from paper mills, aluminum hydroxide containing clay sludge, dredging slimes (oily slimes) and the like, and it is possible to effect such dewatering with a very small amount of applied energy (e.g., 200 kwh or less per 1000 gal.). Also, in effecting dewatering the heavy metals contained in the boundary layer liquid also are removed with the liquid, and depending upon the original nature of the sludge, the sludge may be suitable for fertilizer or other end uses, and the heavy metals or other valuable materials (e.g., phosphoric acid) may be removed from the withdrawn liquid.

According to the present invention, dewatering apparatus for sludge or the like is provided which comprises first and second electrodes; means connecting the electrodes to a source of e.m.f.; means for maintaining the sludge or the like to be treated between the electrodes during treatment; means for providing a continuation of the boundary layer of the sludge disposed between the electrodes, said means allowing the passage of water therethrough, and being disposed in intimate contact with at least one of the electrodes between the electrode and the sludge; and means for ensuring continuous contact between the electrodes and the sludge during treatment even though the volume of the sludge decreases during treatment due to water removal. For most effective removal, the e.m.f. source is a DC source, with the boundary layer continuation means disposed at least in intimate contact with the cathode, and the cathode being constructed to allow passage of water therethrough and being located vertically below the anode. The boundary layer continuation means comprises a layer of material that is porous, fibrous, or strongly absorbent. For porous materials a pore size of about 0.01 to 5 mm is preferred. Suitable exemplary boundary layer continuation means include asbestos cloth, sand, filter paper, and a wide variety of webs of woven or nonwoven inert material including cotton, wool, and polyester webs.

Further, means for effecting continuous feeding and discharge of sludge to and from the means for maintaining the sludge between the electrodes can be provided, such means comprising a pair of conveyor belts operatively disposed between the electrodes for continuously moving sludge to be treated between the electrodes, and means for mounting the conveyor belts and electrodes so that the volume between the conveyor belts decreases from an inlet thereto to an outlet therefrom. The actual conveyor belt itself associated with the cathode preferably provides the boundary layer continuation means. The means for ensuring continuous contact between the electrodes and the sludge preferably comprises a pneumatic cylinder biasing (as opposed to providing large compressive forces) at least a portion of the electrodes together.

According to a method of dewatering slime or sludge according to the present invention, the slime or sludge is settled, and the water produced by the settling operation removed; the slime or sludge is fed between a pair of electrodes while applying a current to the electrodes, at least one of the electrodes having means providing for a continuation of the boundary layer of the slime or sludge between the electrodes; the contact between the electrodes and the sludge is maintained even during volume decreasing of the sludge do to water removal; and the water from the sludge during dewatering is removed through at least one of the electrodes. Where the sludge or slime being treated is phosphate slime, the method comprises the further step of subjecting the slime, after dewatering, to electrodialysis to produce phosphoric acid, the water removed during the settling and dewatering steps being reused for the ultimate further production of phosphate slime (during the production of fertilizer or the like from phosphate rock). Where the sludge or slime being treated is sludge containing heavy metals, the method comprises the further step of subjecting the water removed during dewatering to electrolysis to produce metal-depleted water, and oxidizing the organics in the metal-depleted water to produce substantially pure water.

According to another aspect of the method according to the present invention, it is possible to produce a product sufficiently free of heavy metals to be safely useful as a fertilizer from sewage sludge which originally contained significant amounts of heavy metals. Also, according to the present invention it is possible to treat sludge or slime that is incapable of being dewatered by ambient evaporation so that it is capable of being dewatered by ambient evaporation, and by applying about 200 kwh or less of energy to the sludge or slime while removing water therefrom.

It is the primary object of the present invention to provide an apparatus and method that can successfully dewater a wide variety of slimes and sludges with a minimum energy input. This and other objects of the invention will become clear from an inspection of the detailed description of the invention, and from the appended claims.

BRIEF DESCRIPTION OF THE DRAWINGS

FIG. 1 is a block diagram indicating the steps followed in practicing a method of phosphate slime dewatering according to the present invention;

FIG. 2 is a block diagram indicating the steps followed in practicing a sludge dewatering method according to the present invention;

FIG. 3 is a schematic view of an exemplary settling structure utilizable in the practice of the methods of FIGS. 1 and 2;

FIG. 5 is an exploded perspective view of the interrelationship between electrodes and boundary layer continuation providing material utilizable in the device of FIG. 4;

DETAILED DESCRIPTION OF THE DRAWINGS

Figure 4:
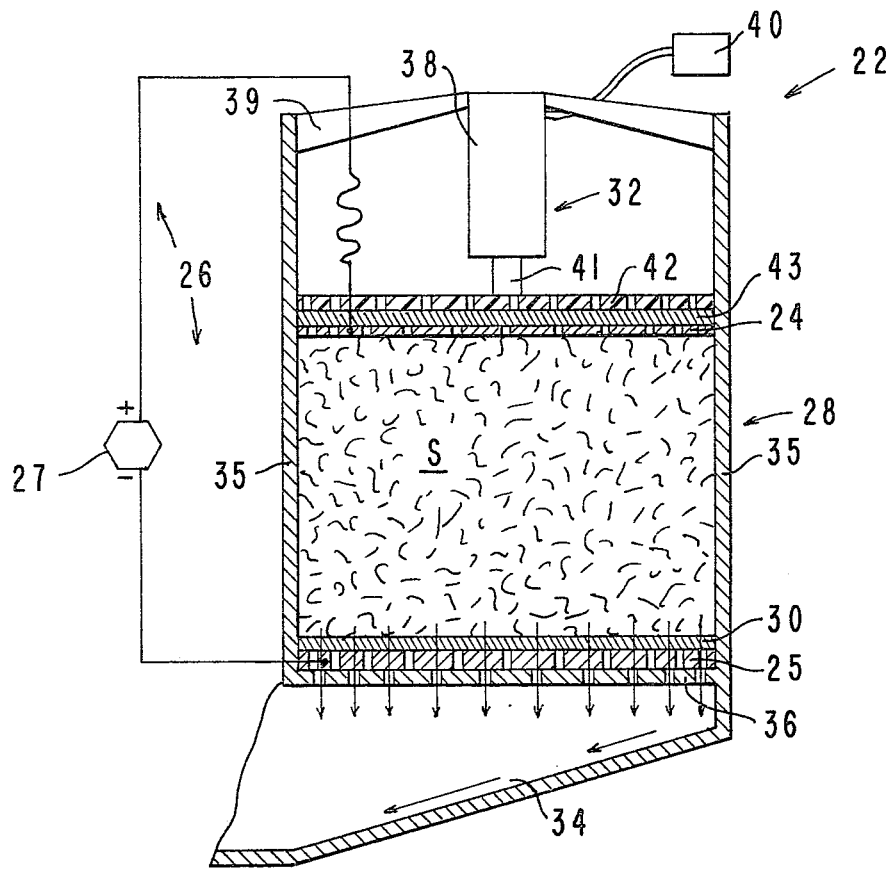
FIG. 4 is a diagrammatic cross-sectional side view of exemplary apparatus for practicing slime or sludge dewatering.

According to the present invention, it is possible to effectively dewater a wide variety of slimes and sludges by electrophoresis, with minimum energy use. Typical slimes and sludges that can be dewatered in practicing the invention include phosphate slime, sewage sludge, water treatment plant sludge, dredging sludge (oily sludge), sludge from paper mills, and aluminum hydroxide containing clay sludge. FIGS. 1 and 2 show in box form two exemplary methods for treating exemplary slimes and sludges according to the invention. FIG. 1 shows a method of dewatering phosphate slime, a waste product produced during the production of fertilizer or the like from phosphate rock, and subsequent production of pure phosphoric acid from the dewatered slime. The raw phosphate slime is first passed to a conventional coagulator 10, such as the type shown in application Ser. No. 841,925, filed Oct. 13, 1977, and then is subsequently passed to a settling station 12 and a dewatering station 13. At both the settling station and the dewatering station, water is removed, and the water may be reutilized for the ultimate further production of phosphate slime during the production of fertilizer from phosphate rock, or the like. The settling 12 can be by any conventional means, such as a settling pond, or an inclined tube 14, disposed at an angle of about 60°, with the slime or sludge for dewatering removed from the bottom of the tube 14, and water to be reutilized removed from the top. After dewatering, the slime is subjected to electrolysis as indicated at 15 in FIGS. 1 and 7, the slime being fed into the cathode chamber 16 of an electrochemical cell, and pure phosphoric acid being removed from the anode chamber 17. The membrane 18 utilized in effecting electrolysis is a nonionic anion permeable membrane, such as disclosed in pending application Ser. No. 814,715, filed July 11, 1977, or in copending application Ser. No. 957,876, filed Nov. 6, 1978, and entitled "Layered Membrane and Processes Utilizing Same".

Figure 8:
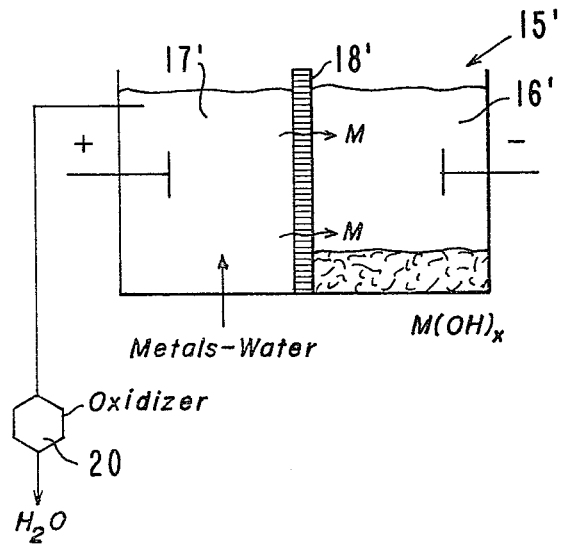
FIG. 8 is a diagrammatic view of an exemplary electrochemical cell utilizable in the process of FIG. 2.

The process illustrated in FIG. 2 results in the production of dewatered sludge from sewage or water treatment sludge containing heavy metals, which dewatered sludge is suitable for use as a fertilizer. The sludge goes through coagulation, settling, and dewatering steps 10, 12, and 13, and the water removed during the dewatering step is subjected to electrolysis as indicated generally at 15' in FIGS. 2 and 8. The electrochemical cell 15' illustrated in FIG. 8 includes a cathode chamber 16', an anode chamber 17', and a membrane 18', which preferably is of the same type as the membrane 18 described above, although it is possible that conventional cationic permeable membranes might be utilized therefor. The metals migrate from the anode chamber 17' to the cathode chamber 16', and metal-depleted water is withdrawn from the top of the chamber 17'. Where significant amounts of organics are present in the water withdrawn from the chamber 17', those components are subjected to oxidation at station 20, water of stream dischargeable quality being produced.

Figure 6:
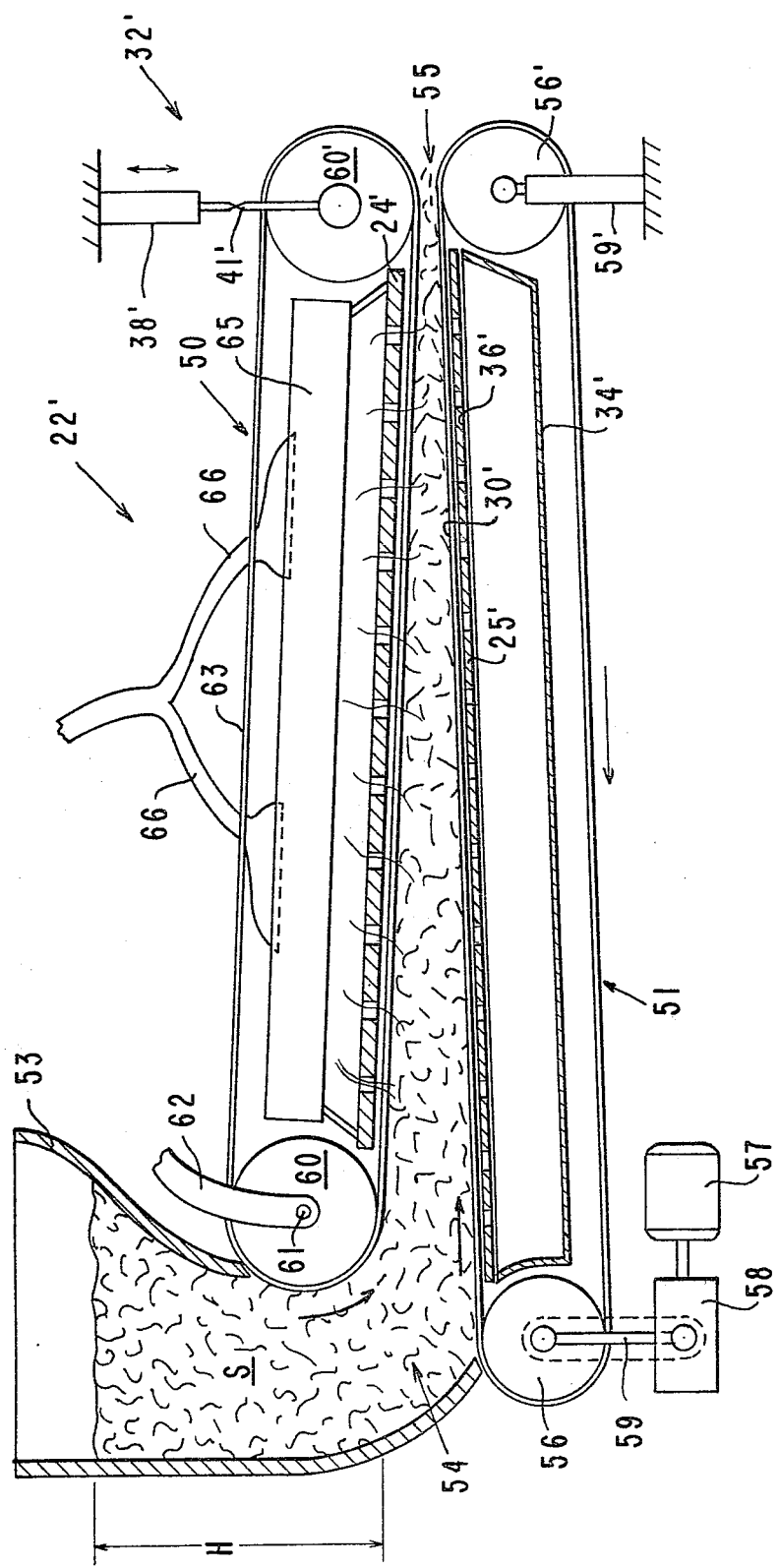
FIG. 6 is a diagrammatic side view of an exemplary apparatus according to the present invention for practicing slime or sludge dewatering in a continuous manner.

In practicing the dewatering steps 13 indicated in block form in FIGS. 1 and 2, dewatering apparatus according to the present invention is utilized, as illustrated in FIGS. 4 through 6. The dewatering apparatus may be utilizable for batch treatment of sludge or the like, such as the apparatus 22 in FIG. 4, or may be utilizable for continuous treatment of sludge or the like, as illustrated at 22' in FIG. 6.

The apparatus 22 (FIG. 4) includes first and second electrodes 24, 25, means 26 for connecting the electrodes up to a source of e.m.f. 27, means 28 for maintaining the sludge or the like to be treated between the electrodes 24, 25, during treatment; means—such as asbestos cloth 30—for providing a continuation of the boundary layer of the sludge or the like disposed between the electrodes 24, 25, the means allowing the passage of water therethrough, and being disposed in intimate contact with at least one of the electrodes 24, 25, between the electrode and the sludge or the like; and means 32 for ensuring continuous contact between the electrodes 24, 25, and the sludge or the like during treatment even during volume decreasing of the sludge or the like due to water removal.

Where the e.m.f. source 27 is a AC source, a boundary layer continuation means—such as asbestos cloth 30—must be provided between both electrodes 24, 25, and the sludge, and water is withdrawn through both electrodes. Preferably, however, the source 27 is a DC source, in which case at least the cathode 25 must have the boundary layer continuation means—such as asbestos cloth 30—in intimate contact therewith.

Both the anode 24 and the cathode 25 are preferably constructed so that they are porous (i.e., as metal grids). The anode and cathode 24, 25, may be made of any suitable material (e.g., the anode may be made of coated valve-metal). Water is withdrawn through the cathode 25, preferably passing into a collection chamber 34.

The boundary layer continuation means comprises a layer of material that is porous, fibrous, and/or strongly absorbent. Where the material is porous, a pore size of about 0.01 to 5 mm is desired, that range providing pores that are large enough so that they are not easily clogged by the sludge, yet not so large that proper treatment will not be effected. Examples of suitable materials utilizable as the boundary layer continuation means include asbestos cloth—indicated at 30 in the drawings—sand, filter paper, and webs of woven or nonwoven inert material including cotton, wool, and polyester webs. The means 28 for maintaining the sludge or the like between the electrodes may comprise—as illustrated in FIG. 4—the sidewalls 35 of a container, access to the container being provided by any suitable means, such as sealable inlet and discharge openings.

As illustrated in FIGS. 4 and 6, preferably the electrodes are mounted so that one is vertically above the other, preferably the anode 24 being mounted above the electrode 25. A perforated bottom wall 36 of the container for the sludge (see FIG. 4) may rigidly support the cathode 25, while the anode 24 is mounted for relative vertical movement with respect to the cathode 25 under the influence of the means 32 for ensuring continuous electrical contact between the electrodes and the sludge during the entire treatment. Such contact-ensuring means 32 preferably comprises a pneumatic cylinder 38 or the like, supported at one end thereof by brackets 39 or the like to the sidewalls 35 of the container for the sludge S, and being actuatable by air from a pressure source 40. The ram 41 of the cylinder 38 is operatively connected to the anode 24, as by a perforated Plexiglas plate 42, with asbestos cloth 43 or like insulating material provided between the anode 24 and the Plexiglas 42. The cylinder 38 does not provide significant compressive force to the sludge S, but does provide a biasing force to the anode 24 sufficient to maintain the electrodes in electrical contact with the sludge during treatment as the volume of sludge decreases and the electrodes 24, 25, move closer to each other.

For the embodiment of the apparatus 22' according to the invention illustrated in FIG. 6—which provides for continuous dewatering of sludge or slime S or the like—the components corresponding to the components of the FIG. 4 embodiment are indicated by the same reference numeral with a "prime" after the reference numeral. The means for effecting continuous feeding and discharge of sludge or the like to and from the means for maintaining the sludge between the electrodes 24', 25', (in the case of the FIG. 6 embodiment sidewalls perpendicular to the electrodes 24', 25', and not shown) include a pair of conveyor belts 50, 51, operatively disposed between the electrodes 24', 25', for continuously moving sludge or the like S to be treated between the electrodes, and means for mounting the conveyor belts and the electrodes so that the volume between the conveyor belts 50, 51, decreases from an inlet 54 thereto to an outlet 55 therefrom.

Preferably, the belt of the lower conveyor belt 51 comprises the boundary layer continuation material, such as asbestos cloth 30', the rollers 56, 56', for the conveyor belt 51 being mounted so that the element 30' is always maintained in intimate contact with the cathode 25', riding over the top thereof. The roller 56 is power driven, as by an electric motor 57 through a gear box dual drive 58. Supports 59, 59'—cooperating with supports for the upper conveyor 50—provide the means for mounting the conveyor belts and electrodes so that the volume between the conveyor belts decreases from the inlet 54 to the outlet 55.

The means for feeding the sludge or slime S further includes the container 53, which provides a head H of sludge or slime S, the head applying a motive force to the sludge or slime S to move it to the area between the conveyors 50, 51.

One of the rollers 60, 60', of the upper conveyor 50 also is powered, and the roller 60—nearest the inlet 54—it is mounted for pivotal movement of the entire conveyor assembly 50 about a horizontal axis 61, a bracket 62 operatively connected to a stationary component pivotally mounting an axle or the like defining the axis 61. The ram 41' is preferably a yoke, attached to opposed ends of the roller 60', movement of the roller 60' vertically by the cylinder 38' changing the relative angular disposition between the conveyors 50, and 51, as the conveyor assembly 50 pivots about the axis 61. Preferably, the upper conveyor belt 63 also is of asbestos cloth or the like, although in some circumstances it can be made of conductive material.

The anode 24' is desirably mounted by a linkage assembly (not shown) that allows the anode to move up and down in pivotal movement about the axis 61 paralleling the rollers 60', while still maintaining the anode in good electrical contact with the slime or sludge, yet not restricting the movement of the belt 63 therepast. Additionally, where poisonous or desirable or pollutant gases will be emitted by the sludge or slime S during treatment, a gas hood 65 is provided disposed above the perforated anode 24', with flexible conduits 66 leading from the gas hood 65 to lead the gas away from the apparatus 22' to a utilization or disposal area.

Figure 7:
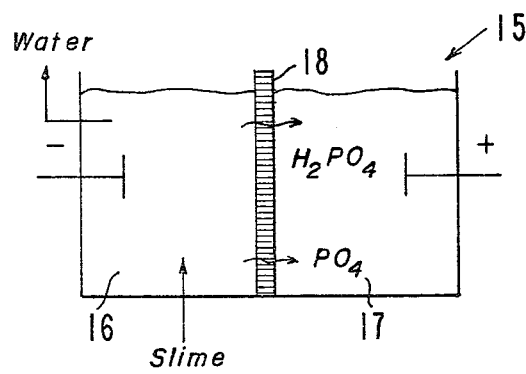
FIG. 7 is a diagrammatic view of an exemplary electrochemical cell utilizable in the process of FIG. 1.

Utilizing the apparatus according to the present invention, it is possible to treat a wide variety of sludges and slimes to effect dewatering thereof. This dewatering is accomplished with a minimum amount of electricity. For instance, in tests run both on water treatment plant sludge (alum) from Tampa, Fla., and conventional phosphate slime, it was possible to dewater the sludge or slime by the application of less than 200 kwh of electricity per thousand gallons of slime or sludge to such an extent that the slime or sludge—which previously was not capable of atmospheric evaporation—did evaporate when exposed to ambient air. For instance, in one test phosphate slime was coagulated and settled until it had a solids concentration of about 12%. Then the slime was subjected to dewatering utilizing apparatus such as illustrated in FIG. 4, and with the application of about 175.4 kwh of electricity per thousand gallons of slime, the slime was dewatered to the extent that it had about 33% solids. This dewatered slime was then atmospherically dried in an environment without direct sunlight and an average temperature of about 80° F. The slime dried essentially completely in about 200 hours, and the solids produced could be landfilled. Alternatively, of course, dewatered slime could have been subjected to electrolysis as indicated in FIGS. 1 and 7.

In many of the tests run on sludge and slime utilizing the present invention, the energy used to effect dewatering was significantly less than 200 kwh per one thousand gallons. For instance, in a test run with sludge from the Tampa, Fla. water system, the sludge was dewatered from a solids concentration of about 2.3% to a solids concentration of about 16.5% with the application of only about 44.1 kwh per thousand gallons of sludge. Table 1 below is a summary of the energy consumption and other variables for several runs in Tampa, Fla. water system sludge:

TABLE I

| Run No. | Amperes | Volts | Watts | Vol. Sludge Used | Wt. Sludge Used (g) | Vol. Water Collected | Vol. Sludge Collected | kwh/1000 gal. | Time Run |
|---|---|---|---|---|---|---|---|---|---|
| 1 | 2 | 14 | 28 | 11 | 999.8 | 600 | 150 | 44.1 | 25 min. |
| 2 | 1 | 10.5 | 10.5 | 11 | 966.0 | 675 | 150 | 23.15 | 35 min. |
| 3 | 4 | 35 | 140 | 11 | 977.0 | 650 | 175 | 176.4 | 20 min. |
| 4 | 4.8 | 42 | 201.6 | 11 | 1000.2 | 650 | 175 | 152.41 | 12 min. |
| 5 | 7 | 40 | 280 | 11 | 998.0 | 650 | 175 | 141.12 | 8 min. |
| 6 | 0.5 | 8 | 4 | 11 | 985.8 | 600 | 150 | 12.1 | 48 min. |
| AC current: | | | | | | | | | |
| 7 | 2 | 10 | 20 | 11 | 993.2 | 300 | 150 | 113.4 | 45 min. |
| 7 | 4 | 10 | 40 | 11 | 993.2 | 300 | 150 | 277.2 | 55 min. |
| DC current; 850 mls dewatered sludge collected from previous runs: | | | | | | | | | |
| 8 | 1.5 | 17 | 25.5 | 850mls | — | 400 | ~450 | 50.2 | 25 min. |

Current density for ZA DC Run = 3.19 A/ft$^2$
Total surface area electrode = 0.627 ft$^2$ In practicing the present invention, especially utilizing DC current, in addition to the sludge or slime S being dewatered, metals in the sludge or slime S pass out of the sludge or slime with the water. Because of this, it is possible to produce a product sufficiently free of heavy metals to be safely used as a fertilizer from sewage sludge or the like containing significant amounts of heavy metals since about 90% of the heavy metal salts will pass out of the sludge with the water during dewatering.

With reference to FIG. 5, an exemplary mode of operation will be set forth, it being understood that the mode of operation for the FIG. 6 embodiment is generally similar.

A quantity of slime or sludge S is fed into the containing means 28 between the sidewalls 35 and the anode and cathode 24, 25. The cylinder 38 is actuated from pressure source 40 to move the anode 24 into good electrical contact with the sludge or slime S, and continues to bias the anode 24 into contact with the sludge or slime S. A current is applied from the source 27 through the lines 26 to the electrodes, with the asbestos cloths 30 providing a continuation of the boundary layer of the sludge or slime adjacent the cathode 25. Water—containing heavy metal salts and/or dissolved organics—passes through the asbestos cloth 30, through the perforations in the cathode 25, and through the perforations in the supporting wall 36 into the water collecting structure 34, wherein it is collected for recycling or for electrolysis in a cell 15'. The current application continues as long as a significant current application can be achieved without excessive energy requirements, and/or until the desired concentration of solids in the sludge or slime S is reached. Then, the cylinder 38 pulls the ram 41, with attached electrode 24, upwardly out of contact with the dewatered sludge or slime S, the sludge or slime S is moved out of the containing means 28, and a new batch of sludge or slime S is inserted between the electrodes 24, 25.

It will thus be seen that according to the present invention an apparatus and method for the dewatering of a wide variety of heretofore difficult or impossible to dewater slimes and sludges has been provided, that can effect dewatering with the application of a minimum amount of energy. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and processes.

What is claimed is:

1. Dewatering apparatus for a sludge or the like comprising
   (a) first and second electrodes comprising an anode and a cathode, the cathode constructed to allow water passage therethrough;
   (b) means for connecting up said electrodes to a D.C. source of e.m.f.;
   (c) means for maintaining sludge or the like to be treated between said electrodes during treatment;
   (d) means providing for feeding of sludge or the like between the electrodes and withdrawal from between the electrodes;
   (e) means for providing a continuation of the boundary layer of sludge or the like disposed between said electrodes, said means allowing the passage of water therethrough, and being disposed in intimate contact only with said cathode, not said anode, between said cathode and the sludge or the like; and
   (f) means for insuring continuous electrical contact between said electrodes and the sludge or the like during treatment so that during volume decreasing of the sludge or the like due to water removal, the electrodes are effectively closer together.

2. Apparatus as recited in claim 1 consisting essentially of only the structures (a)–(f).

3. Apparatus as recited in claims 1 or 2 wherein said boundary layer continuation means comprises a layer of material selected from the group consisting essentially of porous, fibrous, and strongly absorbent materials.

4. Apparatus as recited in claims 1 or 2 wherein said boundary layer continuation means comprises a layer of material selected from the group consisting essentially of sand, filter paper, and webs of woven or nonwoven inert material including cotton, wool, and polyester webs.

5. Apparatus as recited in claims 1 or 2 wherein said boundary layer continuation means comprises a layer of asbestos cloth.

6. Apparatus as recited in claim 2 wherein said means providing feeding and withdrawal of sludge or the like between the electrodes comprises means for effecting continuous feeding and discharge of sludge or the like to and from said means for maintaining sludge or the like between said electrodes during treatment, said means comprising a pair of conveyor belts operatively disposed between said electrodes for continuously moving sludge or the like to be treated between said electrodes, and means for mounting said conveyor belts and said electrodes so that the volume between said conveyor belts decreases from an inlet thereto to an outlet therefrom.

7. Apparatus as recited in claim 6 wherein said feeding means further comprises means for providing a head of sludge or the like for applying a motive force to move sludge or the like to be treated between said conveyors.

8. Apparatus as recited in claim 6 wherein said means for providing a continuation of the boundary layer of sludge or the like disposed in intimate contact with said cathode comprises one of said conveyor belts.

9. Apparatus as recited in claim 1 further comprising means for mounting said anode vertically above said cathode.

10. Apparatus as recited in claim 1 wherein said means for insuring continuous contact between said electrodes and sludge or the like during treatment comprises a pneumatic cylinder biasing at least a portion of said electrodes together.

11. Apparatus as recited in claim 10 wherein said cathode is maintained stationary, and wherein said anode is mounted for relative movement with respect to said cathode, and wherein said pneumatic cylinder applies a slight bias force biasing said anode toward said cathode.

12. Apparatus as recited in claim 8 wherein said anode is mounted vertically above said cathode and one of said conveyor belts is mounted vertically above the other; and wherein said means for insuring continuous contact between said electrodes and the sludge or the like comprises means for pivotally mounting the uppermost conveyor belt at the inlet end thereof for pivotal movement about a generally horizontal axis parallel to a plane containing said cathode, and means for biasing the outlet end thereof into contact with the sludge or the like.

13. Apparatus as recited in claims 1 or 2 wherein said boundary layer continuation providing means comprises a porous material having a pore size between about 0.01 and 5 mm.

14. Dewatering apparatus for a sludge or the like comprising
(a) first and second electrodes;
(b) means for connecting up said electrodes to a source of e.m.f., said source comprising an AC source for supplying AC current with a frequency of between 0 and 120 $H_z$;
(c) means for maintaining sludge or the like to be treated between said electrodes during treatment;
(d) means providing for feeding of sludge or the like between the electrodes and withdrawal from between the electrodes;
(e) means for providing a continuation of the boundary layer of sludge or the like disposed between said electrodes, said means allowing the passage of water therethrough, and being disposed in intimate contact with each of said electrodes, between each electrode and the sludge or the like; and
(f) means for insuring continuous electrical contact between said electrodes and the sludge or the like during treatment so that during volume decreasing of the sludge or the like due to water removal, the electrodes are effectively closer together.

15. Dewatering apparatus for a sludge or the like comprising
(a) first and second electrodes;
(b) means for connecting up said electrodes to a source of e.m.f.;
(c) means for maintaining sludge or the like to be treated between said electrodes during treatment;
(d) means providing for feeding of sludge or the like between the electrodes and withdrawal from between the electrodes;
(e) means for providing a continuation of the boundary layer of sludge or the like disposed between said electrodes, said means allowing the passage of water therethrough, and being disposed in intimate contact with at least one of said electrodes between the electrode and the sludge or the like, said means comprising a layer of asbestos cloth; and
(f) means for insuring continuous electrical contact between said electrodes and the sludge or the like during treatment so that during volume decreasing of the sludge or the like due to water removal, the electrodes are effectively closer together.

* * * * *